United States Patent
Daigle et al.

(10) Patent No.: US 11,365,760 B1
(45) Date of Patent: Jun. 21, 2022

(54) FIRE RATED ISOLATION WASHER

(71) Applicants: Damian Daigle, Rayne, LA (US);
Joseph E. Wilson, Lafayette, LA (US);
Miguel Regato, Youngsville, LA (US)

(72) Inventors: Damian Daigle, Rayne, LA (US);
Joseph E. Wilson, Lafayette, LA (US);
Miguel Regato, Youngsville, LA (US)

( * ) Notice: Subject to any disclaimer, the term of this patent is extended or adjusted under 35 U.S.C. 154(b) by 0 days.

(21) Appl. No.: 16/022,262

(22) Filed: Jun. 28, 2018

Related U.S. Application Data

(60) Provisional application No. 62/528,509, filed on Jul. 4, 2017.

(51) Int. Cl.
*F16B 43/00* (2006.01)
*F16B 33/00* (2006.01)

(52) U.S. Cl.
CPC .......... *F16B 43/001* (2013.01); *F16B 33/008* (2013.01); *F16B 43/00* (2013.01)

(58) Field of Classification Search
CPC ...... F16B 33/004; F16B 33/008; F16B 39/10; F16B 39/24; F16B 43/00; F16B 43/001
USPC ................................................. 411/531, 542
See application file for complete search history.

(56) References Cited

U.S. PATENT DOCUMENTS

| | | | |
|---|---|---|---|
| 3,168,321 A | 2/1965 | Glicksman | |
| 3,170,701 A * | 2/1965 | Hoover | F16J 15/127 411/542 |
| 3,259,404 A * | 7/1966 | Papenguth | F16J 15/127 285/212 |
| 3,726,178 A * | 4/1973 | Dimitry | F16B 43/001 411/371.1 |
| 4,074,011 A | 2/1978 | Teramae et al. | |
| 4,244,661 A | 1/1981 | Dervy | |
| 4,443,145 A * | 4/1984 | Peschges | F16B 43/001 411/369 |
| 4,595,218 A | 6/1986 | Carr et al. | |
| 4,595,892 A | 6/1986 | Martinetti et al. | |
| 4,702,657 A * | 10/1987 | Jelinek | F16J 15/00 411/369 |
| 5,108,156 A * | 4/1992 | Bell | B60B 3/16 188/382 |
| 5,829,933 A | 11/1998 | Kramer | |
| 6,137,210 A | 10/2000 | Hsieh | |
| 6,979,161 B2 | 12/2005 | Ando et al. | |
| 7,755,876 B2 | 7/2010 | Morrill et al. | |
| 7,897,241 B2 * | 3/2011 | Rice | C08J 5/044 16/2.1 |
| 7,936,550 B2 | 5/2011 | Morrill et al. | |
| 8,616,818 B2 * | 12/2013 | Travis | F16B 43/00 411/371.1 |
| 9,027,223 B2 | 5/2015 | Dean et al. | |
| 9,441,664 B2 * | 9/2016 | Utsuno | F16B 43/001 |
| 9,447,810 B2 | 9/2016 | Dean et al. | |
| 9,702,396 B2 | 7/2017 | Liebscher et al. | |

(Continued)

*Primary Examiner* — Roberta S Delisle
(74) *Attorney, Agent, or Firm* — Greg Mier

(57) ABSTRACT

A washer for protecting a flange. The washer is capable of withstanding high compression loads, protecting a flange plate from galvanic corrosion, and maintaining torque load when a flange joint is exposed to extreme heat. The washer has two primary components—an inner ring and an outer ring—that are preferably made of materials having dielectric properties, particularly with respect to electrical insulation. The inner ring and outer ring are preferably fit together using an interference fit.

40 Claims, 4 Drawing Sheets

(56) References Cited

U.S. PATENT DOCUMENTS

| | | | |
|---|---|---|---|
| 10,587,107 B2* | 3/2020 | Morden | F16B 43/001 |
| 2002/0187020 A1 | 12/2002 | Julien | |
| 2010/0277849 A1 | 11/2010 | Morrill et al. | |
| 2015/0023764 A1* | 1/2015 | Lauer | F16B 43/001 |
| | | | 411/542 |
| 2015/0247524 A1* | 9/2015 | Utsuno | F16B 43/001 |
| | | | 411/542 |

* cited by examiner

FIRE RATED ISOLATION WASHER

CROSS REFERENCE TO RELATED APPLICATIONS

The present application claims priority from provisional patent application No. 62/528,509, filed on Jul. 4, 2017.

FIELD OF THE INVENTION

The subject invention generally relates to flat washers. More specifically, the subject invention relates to new and useful washer that is capable of withstanding high compressive loads, protecting a flange joint from galvanic corrosion, and preventing loss of torque load when the flange joint is exposed to extreme heat.

BACKGROUND

It is common to use conduits to carry various fluids from one location to another. These conduits usually consist of a plurality of sections or segments joined together to form a continuous fluid communication pathway, commonly referred to as a pipeline.

Pipelines play a huge role in everyday lives and are essential to most industries. Pipelines are used to transport liquids, gases, and other chemically stable fluids, such as water, sewer, and refined petroleum.

Flanges are an integral part of a pipeline, as they provide the connections necessary to link the sections of pipe that form the pipeline. Flanges also serve the purpose of incorporating valves and other fittings into the pipeline. A typical flange is a disc, collar, or ring that forms a rim at the end of a section of pipe. The disc, collar, or ring is typically welded to the end of the section of pipe to form the flange. When two sections of pipe are equipped with flanges and joined together, a flange joint is formed.

The flange joint is typically held together with threaded bolts and accompanying nuts, where the bolts extend through holes in the rim of the two flanges. In some instances, flat washers are inserted between the nuts/bolt heads and the outer surface of the flanges to distribute the load of the nut/bolt head against the outer surface of the flange, or to provide spacing between the nut/bolt head and the outer surface of the flange, or to prevent galvanic corrosion between the nut/bolt head and the outer surface of the flange. It is difficult to find materials of construction for washers that are capable of withstanding high compressive loads, protecting a flange from galvanic corrosion, and maintaining flange integrity when the flange joint is exposed to extreme heat. As discussed in more detail below, the present invention is a washer having all three of the desirable properties mentioned above.

BRIEF DESCRIPTION OF THE DRAWINGS

The accompanying drawings are provided for illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 5:
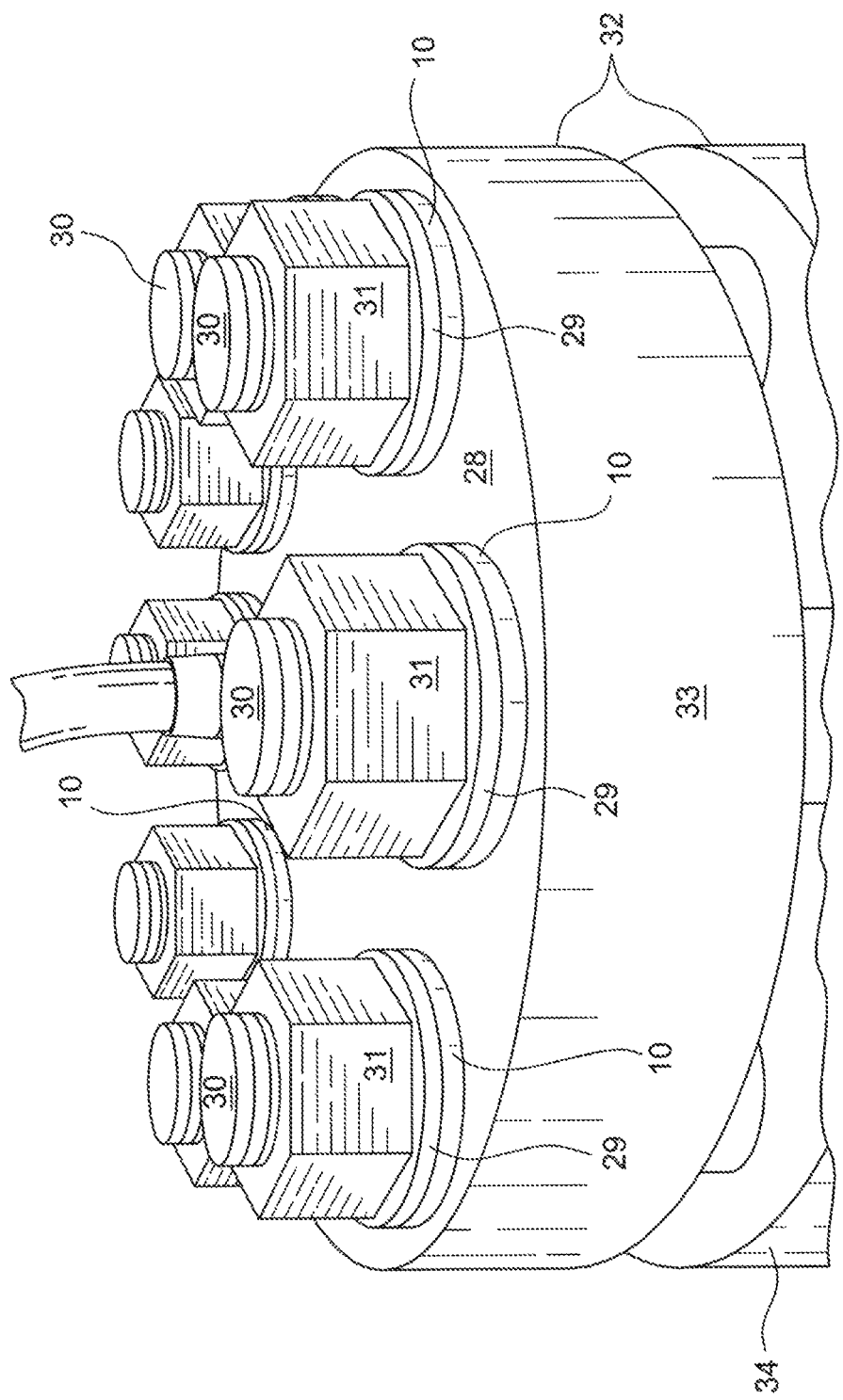
FIG. 5 is an isometric view of several fire rated isolation washers between the outer surface of a flange and epoxy-coated steel washers.
Figure 6:
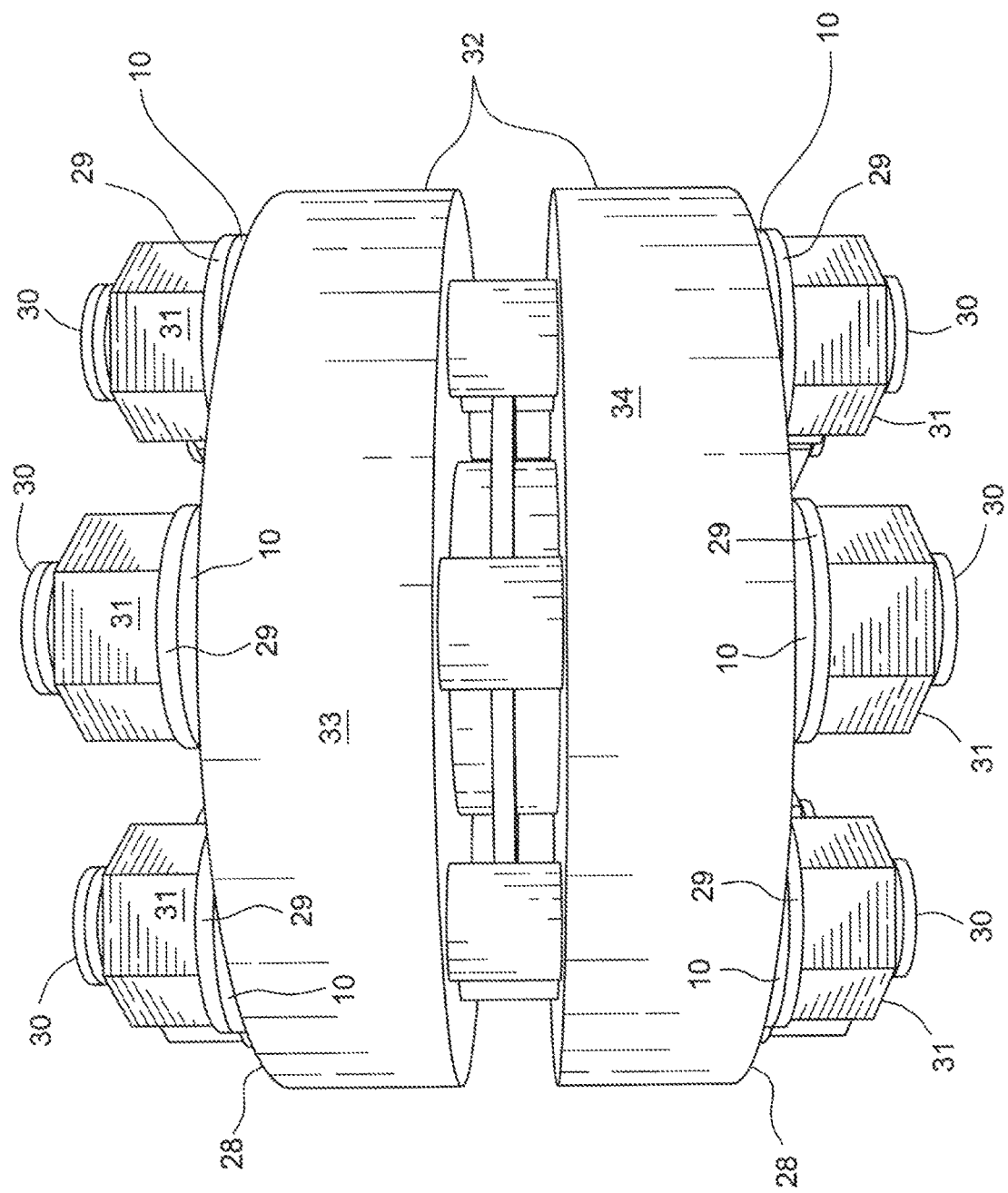
FIG. 6 is a side view of several fire rated isolation washers between the outer surface of a flange and epoxy-coated steel washers.

The present invention is a washer 10 that is capable of withstanding high compression loads, protecting a flange plate from galvanic corrosion, and maintaining torque load when a flange joint is exposed to extreme heat. As shown in FIGS. 5 and 6, washer 10 is designed to be used between an outwardly facing flange face 28 and another flat washer 29. A typical flange joint 32 has a first flange plate 33 and a second flange plate 34 that are held together with threaded flange bolts 30 and accompanying flange nuts 31, where flange bolts 30 extend through bolt holes around the peripheral rim of first flange plate 33 that are substantially aligned with bolt holes around the peripheral rim of second flange plate 34. Flat washers 29 are typically inserted between the flange nuts 31 and the outwardly facing flange faces 28 to distribute the load of the flange nuts 31 against the outwardly facing flange faces 28, or to provide spacing between the flange nuts 31 and the outwardly facing flange faces 28, or to prevent galvanic corrosion between the flange nuts 31 the outwardly facing flange faces 28. Washer 10 of the present invention is designed to distribute the load of the fat washers 29 against the outwardly facing flange faces 28, and to provide spacing between the flat washers 29 and the outwardly facing flange faces 28, and to prevent galvanic corrosion between the flat washers 29 and the outwardly facing flange faces 28.

As shown in FIGS. 1 through 4, the primary components of washer 10 include an inner ring 11 and an outer ring 12. Inner ring 11 is preferably made with materials having dielectric properties, particularly with respect to electrical insulation, where very little electric current flows through the material when the material is subjected to an electric field. In addition to having dielectric properties, the materials used to make inner ring 11 should also have high compression strength and should be fire resistant, chemical resistant, corrosion resistant, and wear resistant.

One of the many examples of acceptable materials for inner ring 11 are dielectric ceramic materials such as alumina or zirconia toughened alumina, the latter of which is known in the industry as ZTA. ZTA typically consists of alumina with a ten to twenty percent zirconia concentration. The zirconia concentration enhances the strength of the alumina through a process known as stress induced transformation toughening. Stress induced transformation toughening results in uniform internal strain, which causes the zirconia structure to crack, and the zirconia particles to switch phases. Because of this phase switch, the amount of zirconia particles increases and creates stresses within the alumina's structure. These stresses effectively heal the crack and block further cracking.

In addition to the increased strength and toughness resulting from stress induced transformation toughening, ZTA also exhibits other notable properties, such as good thermal traits, allowing the material to withstand high temperature applications without experiencing degradation. ZTA also has very good mechanical properties, increased wear resistance when compared with alumina, and offers high corrosion-resistance. The preferred material for inner ring 11 is 20% zirconia toughened alumina, also known as ZTA-20.

Inner ring 11 can be manufactured by many industrial methods known in the art, but the preferred method of manufacturing inner ring 11 is by taking the material of construction and shaping it into the form of a thin disk, with a hole in the middle of the disk, having the desired rough dimensions, and then sintering the disk at a high temperature. Once the disk is sintered, then the disk can be grinded into the desired precise dimensions. The resulting inner ring 11 has a first side 13, a second side 14 opposite said first side 13, an inner edge 15, and an outer edge 16, as shown in FIGS. 1 through 4.

Like inner ring 11, outer ring 12 is preferably made with materials having dielectric properties, particularly with respect to electrical insulation, where very little electric current flows through the material when the material is subjected to an electric field. In addition to having dielectric properties, the materials used to make outer ring 12 should also have high flexural strength and high compression strength, with the compression strength preferably being in the range of 55,000 to 65,000 pounds per square inch. The materials used to make outer ring 12 should also be corrosion resistant, chemical resistant, and wear resistant. In addition to providing compression strength when washer 10 is placed between an outwardly facing flange face 28 and flat washer 29, as shown in FIGS. 5 and 6, outer ring 12 is also designed to protect inner ring 11 from incidental contact or impact when washer 10 is being handled, which may result in inner ring 11 cracking or breaking.

One of the many examples of a suitable material for outer ring 12 is glass reinforced epoxy. Outer ring 12 can be cut from a sheet of glass reinforced epoxy, preferably, but not necessarily, with a waterjet. The resulting outer ring 12 has a first side 17, a second side 18 opposite said first side 17, an inner edge 19, and an outer edge 20, as shown in FIGS. 1 through 4.

Inner ring 11 and outer ring 12 are preferably fit together using an interference fit, which is also known as a press fit or friction fit. An interference fit is a fastening between two parts which is achieved by friction after the parts are pushed together. An interference fit is generally achieved by shaping the two mating parts so that one or the other, or both, slightly deviate in size from the nominal dimension. The word interference refers to the fact that one part slightly interferes with the space that the other is taking up.

For example, a shaft, or an axle, may be ground slightly oversize and the hole in the bearing, or the wheel, (through which it is going to pass with an interference fit) may be ground slightly undersized. When the shaft is pressed into the bearing, or when the wheels and roller bearings are pressed onto an axle as in the case of a wheel set, the two parts interfere with each other's occupation of space. The result is that both parts elastically deform slightly to fit together creating an extremely high force which results in extremely high friction between the parts—so high that even large amounts of torque cannot turn one of them relative to the other. The two parts are locked together and turn in unison.

In the preferred embodiment of the present invention, inner ring 11 has an outer diameter 22 that is slightly longer than the inner diameter 23 of outer ring 12 to ensure a tight interference fit when inner ring 11 and outer ring 12 are pressed together. Outer diameter 22 of inner ring 11 is preferably 0.003 inches longer than inner diameter 23 of outer ring 12.

Figure 1:
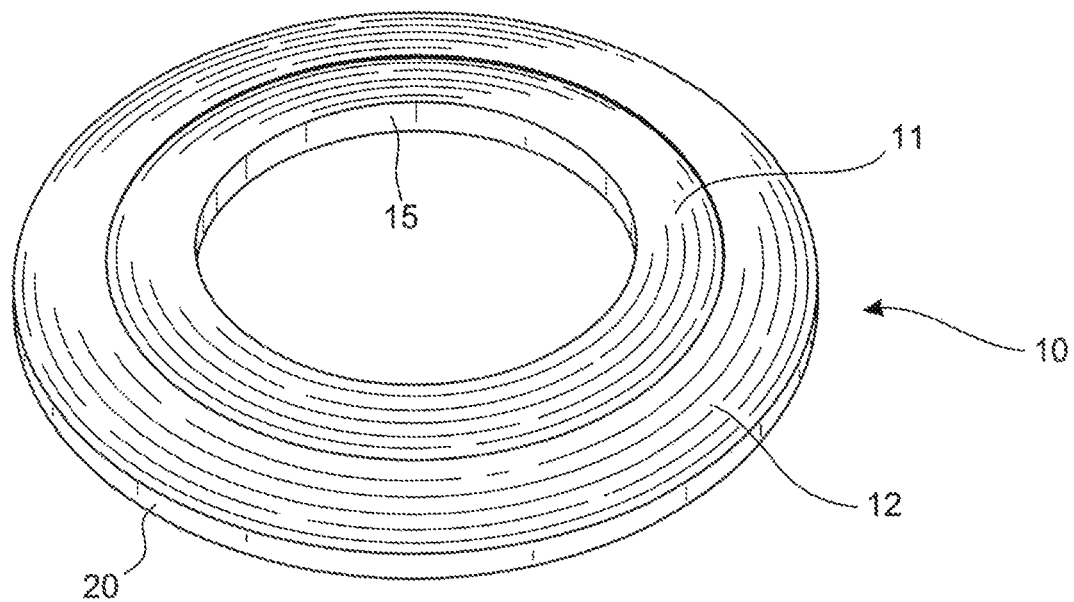
FIG. 1 is an isometric view of a fire rated isolation washer.
Figure 2:
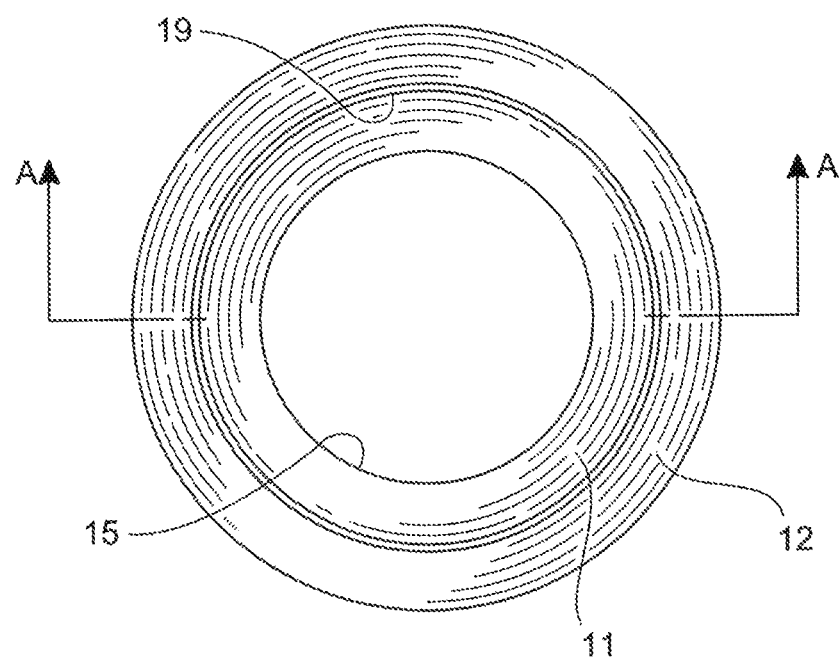
FIG. 2 is a top view of the fire rated isolation washer.
Figure 3:
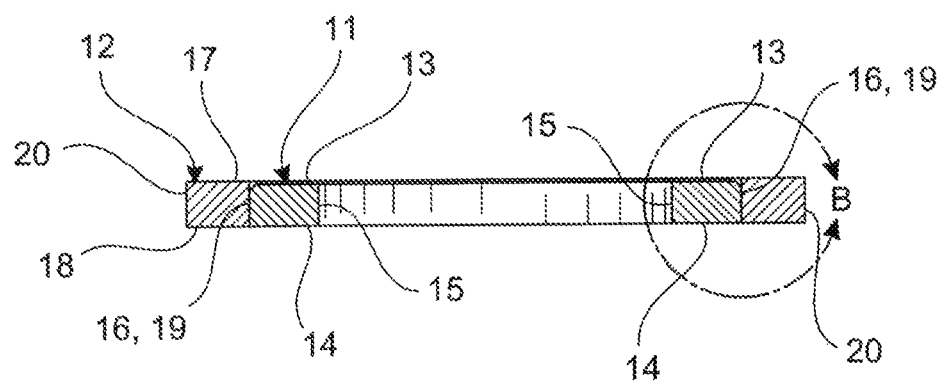
FIG. 3 is a side, cut away view of the fire rated isolation washer along A-A of FIG. 2.
Figure 4:
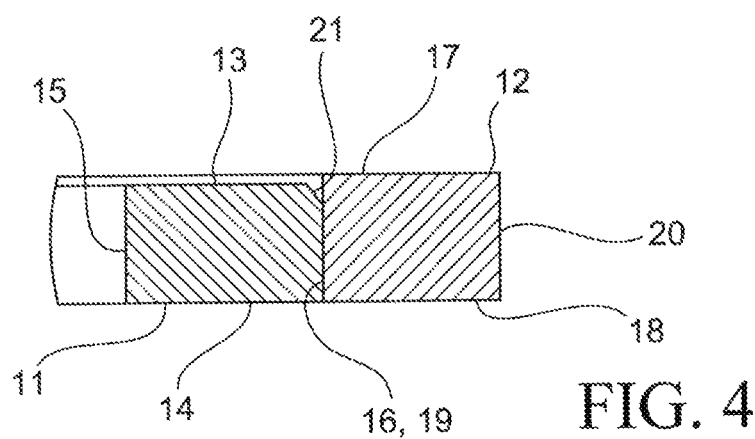
FIG. 4 is a side, cut away view of a portion of the fire rated isolation washer appearing in Circle B in FIG. 3, showing relative thicknesses of the outer ring and the inner ring of the fire rated isolation washer.

As shown in FIGS. 3 and 4, inner ring 11 preferably has a peripheral chamfer 21 at the intersection of first side 13 and outer edge 16 to make it easier to tightly press inner ring 11 and outer ring 12 together. Chamfer 21 helps to prevent cracking of either inner ring 11 or outer ring 12 when the two rings are fit together. Inner ring 11 preferably has one peripheral chamfer 21 at the intersection of first side 13 and outer edge 16 but can also have a second peripheral chamfer (not shown) at the intersection of second side 14 and outer edge 16.

An alternative method of fitting inner ring 11 and outer ring 12 together is to mold outer ring 12 onto inner ring 11 using a method such as liquid composite molding, during which inner ring 11 is placed onto a center post in a compression mold, after which reinforcing fiber material with resin binder is placed around outer edge 16 of inner ring 11, after which heat and pressure are applied to mold and cure the composite material into an outer ring 12. With this alternative method, outer ring 12 preferably has a compression strength of approximately 60,000 pounds per square inch.

As shown in FIG. 4, the thickness 24 of inner ring 11 is preferably slightly less than the thickness 25 of outer ring 12, thereby creating a gap 26 having a depth 27. In use, gap 26 protects inner ring 11 from the compression loads when the flange joint is tightened together, as shown in FIGS. 5 and 6. Depth 27 depends on the size of washer 10, with larger washers requiring larger depths because of the higher compression forces applied to the larger washers. The preferred range of depth 27 is 0.008 inches to 0.025 inches, depending on the size of washer 10. Depth 27 is typically shorter for a smaller washer 10.

It is understood that several embodiments of the present invention have been disclosed by way of example and that other modifications and alterations may occur to those skilled in the art without departing from the scope and spirit of the present invention.

What is claimed is:

1. A washer comprising:
   (a) an inner ring having a first side, a second side opposite said first side, an inner edge, an outer edge, a peripheral chamfer at the intersection of said first side and said outer edge, an outer diameter, and a thickness measured from said first side to said second side; and
   (b) an outer ring having an inner edge contiguous to said outer edge of said inner ring, said outer ring having a first side substantially parallel to said first side of said inner ring, a second side opposite said first side of said outer ring, said second side of said outer ring substantially parallel to said second side of said inner ring, an outer edge, an inner diameter, and a thickness measured from said first side of said outer ring to said second side of said outer ring, said thickness of said outer ring being greater than said thickness of said inner ring.

2. The washer of claim 1, where said inner ring and said outer ring are made of materials that are corrosion resistant, chemical resistant, and have dielectric properties.

3. The washer of claim 2, where said inner ring is made of materials capable of withstanding temperatures as high as 1700 degrees Fahrenheit.

4. The washer of claim 3, where said inner ring is made of dielectric ceramic materials.

5. The washer of claim 4, where said inner ring is made of 20 percent zirconia toughened alumina.

6. The washer of claim 5, where said outer ring is made of materials having a compression strength in the range of 55,000 to 65,000 pounds per square inch.

7. The washer of claim 6, where said outer ring is made of glass reinforced epoxy.

8. The washer of claim 7, where said outer diameter of said inner ring is longer than said inner diameter of said outer ring.

9. The washer of claim 8, where said outer diameter of said inner ring is 0.003 inches longer than said inner diameter of said outer ring.

10. The washer of claim 9, where said inner ring and said outer ring are pressed together using an interference fit.

11. The washer of claim 10, where said inner ring and said outer ring are molded together using the process of liquid composite molding.

12. The washer of claim 11, where said thickness of said outer ring is 0.008 inches to 0.025 inches greater than said thickness of said inner ring.

13. The washer of claim 12, where said inner ring further comprises a peripheral chamfer at the intersection of said second side of said inner ring and said outer edge of said inner ring.

14. An apparatus for protecting a flange face, said apparatus comprising:
(a) a flange joint comprising a first flange plate and a second flange plate, said first flange plate having an outwardly facing flange face, a peripheral rim, and a plurality of bolt holes around said peripheral rim, said second flange plate having an outwardly facing flange face, a peripheral rim, and a plurality of bolt holes around said peripheral rim, where said plurality of bolt holes around said peripheral rim of said first flange plate are substantially aligned with said plurality of bolt holes around said peripheral rim of said second flange plate;
(b) a flange bolt for each of said plurality of bolt holes around said peripheral rim of said first flange plate, each of said flange bolts having a first end and a second end, where one flange bolt extends through one of each of said plurality of bolt holes around said peripheral rim of said first flange plate and one of each of said substantially aligned bolt holes around said peripheral rim of said second flange plate, where the first end of said flange bolt extends beyond said outwardly facing flange face of said first flange plate and where the second end of said flange bolt extends beyond said outwardly facing flange face of said second flange plate;
(c) a first washer placed around each of said first ends of said flange bolts extending beyond said outwardly facing flange face of said first flange plate, each of said first washers comprising an inner ring having a first side, a second side opposite said first side, an inner edge, an outer edge, a peripheral chamfer at the intersection of said first side and said outer edge, an outer diameter, and a thickness measured from said first side to said second side, each of said first washers further comprising an outer ring having an inner edge contiguous to said outer edge of said inner ring, said outer ring having a first side substantially parallel to said first side of said inner ring, a second side opposite said first side of said outer ring, said second side of said outer ring substantially parallel to said second side of said inner ring, an outer edge, an inner diameter, and a thickness measured from said first side of said outer ring to said second side of said outer ring, said thickness of said outer ring being greater than said thickness of said inner ring;
(d) a second washer placed around each of said second ends of said flange bolts extending beyond said outwardly facing flange face of said second flange plate, each of said plurality of second washers comprising an inner ring having a first side, a second side opposite said first side, an inner edge, an outer edge, a peripheral chamfer at the intersection of said first side and said outer edge, an outer diameter, and a thickness measured from said first side to said second side, each of said second washers further comprising an outer ring having an inner edge contiguous to said outer edge of said inner ring, said outer ring having a first side substantially parallel to said first side of said inner ring, a second side opposite said first side of said outer ring, said second side of said outer ring substantially parallel to said second side of said inner ring, an outer edge, an inner diameter, and a thickness measured from said first side of said outer ring to said second side of said outer ring, said thickness of said outer ring being greater than said thickness of said inner ring;
(e) a third washer placed around each of said first ends of said flange bolts extending beyond said outwardly facing flange face of said first flange plate, where each of said first washers are located on a first end of a flange bolt between said outwardly facing flange face of said first flange plate and a third washer;
(f) a fourth washer placed around each of said second ends of said flange bolts extending beyond said outwardly facing flange face of said second flange plate, where each of said second washers are located on a second end of a flange bolt between said outwardly facing flange face of said second flange plate and a fourth washer;
(g) a flange nut secured to the first end of each of said plurality of flange bolts and the second end of each of said plurality of flange bolts, where each of said first washers and each of said third washers are located between said outwardly facing flange face of said first flange plate and a flange nut, and where each of said second washers and each of said fourth washers are located between said outwardly facing flange face of said second flange plate and a flange nut, where said flange nuts are used to tighten and hold together said first and second flange plates and said first, second, third, and fourth plurality of washers.

15. The apparatus for protecting a flange face of claim 14, where said inner rings and said outer rings of said first and second washers are made of materials that are corrosion resistant, chemical resistant, and have dielectric properties.

16. The apparatus for protecting a flange face of claim 15, where said inner rings of said first and second washers are made of materials capable of withstanding temperatures as high as 1700 degrees Fahrenheit.

17. The apparatus for protecting a flange face of claim 16, where said inner rings of said first and second washers are made of dielectric ceramic materials.

18. The apparatus for protecting a flange face of claim 17, where said inner rings of said first and second washers are made of 20 percent zirconia toughened alumina.

19. The apparatus for protecting a flange face of claim 18, where said outer rings of said first and second washers are made of materials having a compression strength in the range of 55,000 to 65,000 pounds per square inch.

20. The apparatus for protecting a flange face of claim 19, where said outer rings of said first and second washers are made of glass reinforced epoxy.

21. The apparatus for protecting a flange face of claim 20, where said outer diameter of said inner rings of said first and second washers is longer than said inner diameter of said outer rings of said first and second washers.

22. The apparatus for protecting a flange face of claim 21, where said outer diameter of said inner rings of said first and second washers is 0.003 inches longer than said inner diameter of said outer rings of said first and second washers.

23. The apparatus for protecting a flange face of claim 22, where said inner ring and said outer ring of each of said first and second washers are pressed together using an interference fit.

24. The apparatus for protecting a flange face of claim 23, where said inner ring and said outer ring of each of said first and second washers are molded together using the process of liquid composite molding.

25. The apparatus for protecting a flange face of claim 24, where said thickness of said outer rings of said first and second washers is 0.008 inches to 0.025 inches greater than said thickness of said inner rings of said first and second washers.

26. The apparatus for protecting a flange face of claim 25, where said inner rings of said first and second washers further comprise a peripheral chamfer at the intersection of said second side of said inner rings and said outer edge of said inner rings.

27. A method for protecting a flange face, said method comprising the steps of:
    (a) providing a flange joint comprising a first flange plate and a second flange plate, said first flange plate having an outwardly facing flange face, a peripheral rim, and a plurality of bolt holes around said peripheral rim, said second flange plate having an outwardly facing flange face, a peripheral rim, and a plurality of bolt holes around said peripheral rim, where said plurality of bolt holes around said peripheral rim of said first flange plate are substantially aligned with said plurality of bolt holes around said peripheral rim of said second flange plate;
    (b) providing a flange bolt for each of said plurality of bolt holes around said peripheral rim of said first flange plate, each of said flange bolts having a first end and a second end, where one flange bolt extends through one of each of said plurality of bolt holes around said peripheral rim of said first flange plate and one of each of said substantially aligned bolt holes around said peripheral rim of said second flange plate, where the first end of said flange bolt extends beyond said outwardly facing flange face of said first flange plate and where the second end of said flange bolt extends beyond said outwardly facing flange face of said second flange plate;
    (c) providing a first washer placed around each of said first ends of said flange bolts extending beyond said outwardly facing flange face of said first flange plate, each of said first washers comprising an inner ring having a first side, a second side opposite said first side, an inner edge, an outer edge, a peripheral chamfer at the intersection of said first side and said outer edge, an outer diameter, and a thickness measured from said first side to said second side, each of said first washers further comprising an outer ring having an inner edge contiguous to said outer edge of said inner ring, said outer ring having a first side substantially parallel to said first side of said inner ring, a second side opposite said first side of said outer ring, said second side of said outer ring substantially parallel to said second side of said inner ring, an outer edge, an inner diameter, and a thickness measured from said first side of said outer ring to said second side of said outer ring, said thickness of said outer ring being greater than said thickness of said inner ring;
    (d) providing a second washer placed around each of said second ends of said flange bolts extending beyond said outwardly facing flange face of said second flange plate, each of said plurality of second washers comprising an inner ring having a first side, a second side opposite said first side, an inner edge, an outer edge, a peripheral chamfer at the intersection of said first side and said outer edge, an outer diameter, and a thickness measured from said first side to said second side, each of said second washers further comprising an outer ring having an inner edge contiguous to said outer edge of said inner ring, said outer ring having a first side substantially parallel to said first side of said inner ring, a second side opposite said first side of said outer ring, said second side of said outer ring substantially parallel to said second side of said inner ring, an outer edge, an inner diameter, and a thickness measured from said first side of said outer ring to said second side of said outer ring, said thickness of said outer ring being greater than said thickness of said inner ring;
    (e) providing a third washer placed around each of said first ends of said flange bolts extending beyond said outwardly facing flange face of said first flange plate, where each of said first washers are located on a first end of a flange bolt between said outwardly facing flange face of said first flange plate and a third washer;
    (f) providing a fourth washer placed around each of said second ends of said flange bolts extending beyond said outwardly facing flange face of said second flange plate, where each of said second washers are located on a second end of a flange bolt between said outwardly facing flange face of said second flange plate and a fourth washer;
    (g) providing a flange nut secured to the first end of each of said plurality of flange bolts and the second end of each of said plurality of flange bolts, where each of said first washers and each of said third washers are located between said outwardly facing flange face of said first flange plate and a flange nut, and where each of said second washers and each of said fourth washers are located between said outwardly facing flange face of said second flange plate and a flange nut, where said flange nuts are used to tighten and hold together said first and second flange plates and said first, second, third, and fourth plurality of washers.

28. The method for protecting a flange face of claim 27, further comprising the step of manufacturing said inner rings and said outer rings of said first and second washers with materials that are corrosion resistant, chemical resistant, and have dielectric properties.

29. The method for protecting a flange face of claim 28, further comprising the step of manufacturing said inner rings of said first and second washers with materials capable of withstanding temperatures as high as 1700 degrees Fahrenheit.

30. The method for protecting a flange face of claim 29, further comprising the step of manufacturing said inner rings of said first and second washers with dielectric ceramic materials.

31. The method for protecting a flange face of claim 30, further comprising the step of manufacturing said inner rings of said first and second washers with 20 percent zirconia toughened alumina.

32. The method for protecting a flange face of claim 31, further comprising the step of manufacturing said outer rings of said first and second washers with materials having compression strength in the range of 55,000 to 65,000 pounds per square inch.

33. The method for protecting a flange face of claim 32, further comprising the step of manufacturing said outer rings of said first and second washers with glass reinforced epoxy.

34. The method for protecting a flange face of claim 33, further comprising the step of using a waterjet to cut said outer rings of said first and second washers from a sheet of glass reinforced epoxy.

35. The method for protecting a flange face of claim 34, further comprising the step of providing an outer diameter of said inner rings of said first and second washers that is longer than said inner diameter of said outer rings of said first and second washers.

36. The method for protecting a flange face of claim 35, further comprising the step of providing an outer diameter of said inner rings of said first and second washers that is 0.003 inches longer than said inner diameter of said outer rings of said first and second washers.

37. The method for protecting a flange face of claim 36, further comprising the step of pressing together said inner ring and said outer ring of each of said first and second washers using an interference fit.

38. The method for protecting a flange face of claim 37, further comprising the step of molding together said inner ring and said outer ring of each of said first and second washers using the process of liquid composite molding.

39. The method for protecting a flange face of claim 38, further comprising the step of providing a thickness of said outer rings of said first and second washers that is 0.008 inches to 0.025 inches greater than said thickness of said inner rings of said first and second washers.

40. The method for protecting a flange face of claim 39, further comprising the step of providing a peripheral chamfer at the intersection of said second side of said inner rings and said outer edge of said inner rings of said first and second washers.

* * * * *